(12) United States Patent  
Wang

(10) Patent No.: US 11,922,121 B2  
(45) Date of Patent: Mar. 5, 2024

(54) METHOD AND APPARATUS FOR INFORMATION EXTRACTION, ELECTRONIC DEVICE, AND STORAGE MEDIUM

(71) Applicant: BOE Technology Group Co., Ltd., Beijing (CN)

(72) Inventor: Bingqian Wang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 328 days.

(21) Appl. No.: 17/425,556

(22) PCT Filed: Jan. 13, 2021

(86) PCT No.: PCT/CN2021/071485  
§ 371 (c)(1),  
(2) Date: Jul. 23, 2021

(87) PCT Pub. No.: WO2021/147726  
PCT Pub. Date: Jul. 29, 2021

(65) Prior Publication Data  
US 2023/0153526 A1    May 18, 2023

(30) Foreign Application Priority Data  
Jan. 21, 2020  (CN) .......................... 202010071824.3

(51) Int. Cl.  
*G06F 40/279*  (2020.01)  
*G06F 16/35*  (2019.01)  
(Continued)

(52) U.S. Cl.  
CPC .......... *G06F 40/279* (2020.01); *G06F 16/353* (2019.01); *G06F 16/367* (2019.01); *G06F 40/169* (2020.01); *G06F 40/30* (2020.01)

(58) Field of Classification Search  
CPC .... G06F 40/279; G06F 16/353; G06F 16/367; G06F 40/169; G06F 40/30  
See application file for complete search history.

(56) References Cited

U.S. PATENT DOCUMENTS 10,325,106 B1   6/2019  Snelson  
10,825,449 B1 * 11/2020  Chinnalagu ......... G10L 15/1815  
(Continued)

FOREIGN PATENT DOCUMENTS

CN        106055536 A      10/2016  
CN        106709006 A       5/2017  
(Continued)

OTHER PUBLICATIONS

CN202010071824.3 first office action.

*Primary Examiner* — Kevin Ky  
(74) *Attorney, Agent, or Firm* — IPro, PLLC

(57) ABSTRACT

The present disclosure provides a method and an apparatus for information extraction, an electronic device, and a storage medium. The method for information extraction includes: first obtaining text data, and then inputting the text data into an information extraction model obtained through pre-training to obtain triple information contained in the text data, wherein the triple information includes a subject, a predicate and an object in the text data. The information extraction model includes a binary classification sub-model and a multi-label classification sub-model, wherein the binary classification sub-model is configured to extract the subject in the text data, and the multi-label classification sub-model is configured to extract the predicate and the object corresponding to the subject in the text data according to the subject and the text data.

16 Claims, 7 Drawing Sheets

Obtain text data — 101

Input the text data into an information extraction model obtained through pre-training to obtain triple information contained in the text data, wherein the triple information includes a subject, a predicate and an object in the text data; the information extraction model includes a binary classification sub-model and a multi-label classification sub-model, the binary classification sub-model is configured to extract the subject in the text data, and the multi-label classification sub-model is configured to extract the predicate and the object corresponding to the subject in the text data according to the subject and the text data — 102

(51) Int. Cl.
    *G06F 16/36*      (2019.01)
    *G06F 40/169*    (2020.01)
    *G06F 40/30*     (2020.01)

(56) References Cited

U.S. PATENT DOCUMENTS

| | | | |
|---|---|---|---|
| 10,977,573 B1* | 4/2021 | Dalton | G06F 16/80 |
| 2007/0083357 A1* | 4/2007 | Moore | G06F 40/45 |
| | | | 704/4 |
| 2010/0185700 A1 | 7/2010 | Bodain | |
| 2018/0082183 A1 | 3/2018 | Hertz et al. | |
| 2018/0232443 A1* | 8/2018 | Delgo | G06F 16/35 |
| 2018/0276525 A1 | 9/2018 | Jiang et al. | |
| 2019/0087724 A1 | 3/2019 | Park et al. | |
| 2019/0103095 A1* | 4/2019 | Singaraju | G06F 16/35 |
| 2019/0332620 A1* | 10/2019 | Wason | G06F 40/30 |
| 2019/0354544 A1* | 11/2019 | Hertz | G06N 5/00 |
| 2023/0153526 A1* | 5/2023 | Wang | G06N 3/08 |
| | | | 704/9 |
| 2023/0196127 A1* | 6/2023 | Zheng | G06F 18/29 |
| | | | 706/45 |

FOREIGN PATENT DOCUMENTS

| | | |
|---|---|---|
| CN | 106844368 A | 6/2017 |
| CN | 108073711 A | 5/2018 |
| CN | 108694208 A | 10/2018 |
| CN | 108874778 A | 11/2018 |
| CN | 109597855 A | 4/2019 |
| CN | 111291185 A | 6/2020 |
| KR | 20180108257 A | 10/2018 |

* cited by examiner

Knowledge
Graph
Framework for automatic information extraction

METHOD AND APPARATUS FOR INFORMATION EXTRACTION, ELECTRONIC DEVICE, AND STORAGE MEDIUM

CROSS REFERENCE TO RELATED APPLICATION

The present disclosure claims priority to Chinese Patent Application No. 202010071824. 3, titled "METHOD AND APPARATUS FOR INFORMATION EXTRACTION, ELECTRONIC DEVICE, AND STORAGE MEDIUM" and filed to the State Patent Intellectual Property Office on Jan. 21, 2020, the entire contents of which are incorporated herein by reference.

TECHNICAL FIELD

The present disclosure relates to the field of information processing technologies, and more particularly, to a method and an apparatus for information extraction, an electronic device, and a storage medium.

BACKGROUND

With the continuous development of deep learning and other fields, artificial intelligence (AI) has gradually stepped into various fields and is dedicated to improving people's lives. AI has surpassed humans in image recognition, speech recognition and other fields. However, in the field of natural language processing, due to the complexity of human language and the diversity of things, the existing technologies are still unable to fully achieve semantic comprehension. Therefore, a bridge of semantic connection (knowledge graph) is needed.

The knowledge graph is composed of entities, attributes, and relationships. In essence the knowledge graph is a semantic network. Nodes in the network represent entities that exist in the real world or attribute values, and edges between the nodes represent the relationship between two entities. At present, the knowledge graph technology is mainly used in intelligent semantic search, mobile personal assistants and question answering systems.

SUMMARY

The present disclosure provides a method and an apparatus for information extraction, an electronic device, and a storage medium, to improve efficiency and accuracy of information extraction.

To solve the above problems, the present disclosure discloses a method for information extraction, which includes:
  obtaining text data; and
  inputting the text data into an information extraction model obtained through pre-training to obtain triple information contained in the text data, wherein the triple information includes a subject, a predicate and an object in the text data. The information extraction model includes a binary classification sub-model and a multi-label classification sub-model. The binary classification sub-model is configured to extract the subject in the text data, and the multi-label classification sub-model is configured to extract the predicate and the object corresponding to the subject in the text data according to the subject and the text data.

In an alternative implementation, before the step of inputting the text data into an information extraction model obtained through pre-training to obtain triple information contained in the text data, the method for information extraction also includes: obtaining the information extraction model. The step of obtaining the information extraction model includes:
  obtaining a sample set, the sample set comprising a plurality of texts to be trained and triple annotated information of each of the plurality of texts to be trained, the triple annotated information comprising subject-annotated information, predicate-annotated information, and object-annotated information;
  inputting the text to be trained into a first pre-trained language model, and sending output information from the first pre-trained language model to a first neural network model;
  inputting the output information from the first neural network model and the text to be trained into a second pre-trained language model, and sending output information from the second pre-trained language model into a second neural network model; and
  training the first pre-trained language model, the first neural network model, the second pre-trained language model and the second neural network model according to the output information from the first neural network model, the output information from the second neural network model and the triple annotated information, to obtain the information extraction model, wherein the first pre-trained language model and the first neural network model trained constitute the binary classification sub-model, and the second pre-trained language model and the second neural network model trained constitute the multi-label classification sub-model.

In an alternative implementation, the step of training the first pre-trained language model, the first neural network model, the second pre-trained language model and the second neural network model according to the output information from the first neural network model, the output information from the second neural network model and the triple annotated information, to obtain the information extraction model includes:
  determining a first loss function according to the output information from the first neural network model and the subject-annotated information;
  determining a second loss function according to the output information from the second neural network model, the predicate-annotated information, and the object-annotated information; and
  optimizing parameters in the first pre-trained language model, the first neural network model, the second pre-trained language model and the second neural network model to obtain the information extraction model, such that sum of the first loss function and the second loss function is minimum.

In an alternative implementation, the first loss function and the second loss function both are cross-entropy loss functions.

In an alternative implementation, the step of obtaining a sample set includes:
  obtaining an unstructured text sample;
  processing the unstructured text sample to obtain a text to be annotated;
  obtaining a text to be trained that has been annotated and triple annotated information of the text to be trained; and annotating the text to be annotated according to the triple annotated information in response to the text to be annotated comprising the subject-annotated information and the object-annotated information in the triple annotated information.

In an alternative implementation, the step of obtaining a sample set also includes:

predicting the text to be annotated by utilizing K prediction models obtained through pre-training to obtain K pieces of triple prediction information;

when a ratio of quantity of first triple information to K is greater than a first preset threshold, adding the first triple information as the triple annotated information of the text to be annotated into the sample set, wherein the first triple information is triple information that appears in the triple prediction information but does not appear in the triple annotated information of the text to be annotated; and when a ratio of quantity of second triple information to K is greater than a second preset threshold, deleting the second triple information from the triple annotated information of the text to be annotated, wherein the second triple information is triple information that appears in the triple annotated information of the text to be annotated but does not appear in the triple prediction information.

K is greater than or equal to 5 and less than or equal to 10.

In an alternative implementation, before the step of predicting the text to be annotated by utilizing K prediction models obtained through pre-training to obtain K pieces of triple prediction information, the method for information extraction includes:

obtaining the K prediction models by means of K-fold cross validation according to the text to be trained that has been annotated and the triple annotated information of the text to be trained.

To solve the above problems, the present disclosure also discloses an apparatus for information extraction, which includes:

an obtaining module, configured to obtain text data; and an extraction module, configured to input the text data into an information extraction model obtained through pre-training to obtain triple information contained in the text data, wherein the triple information includes a subject, a predicate and an object in the text data. The information extraction model includes a binary classification sub-model and a multi-label classification sub-model. The binary classification sub-model is configured to extract the subject in the text data, and the multi-label classification sub-model is configured to extract the predicate and the object corresponding to the subject in the text data according to the subject and the text data.

To solve the above problems, the present disclosure also discloses an electronic device, which includes:

a processor, and a memory configured to store instructions executable by the processor.

The processor is configured to execute the instructions to implement the method for information extraction according to any one of the above embodiments.

To solve the above problems, the present disclosure also discloses a storage medium. Instructions in the storage medium are executable by a processor of an electronic device, whereby the electronic device is caused to perform the method for information extraction according to any one of the above embodiments.

The above description is merely an overview of the technical solutions of the present disclosure. In order to more apparently understand the technical means of the present disclosure to implement in accordance with the contents of specification, and to more readily understand above and other objectives, features and advantages of the present disclosure, specific embodiments of the present disclosure are provided hereinafter.

BRIEF DESCRIPTION OF THE DRAWINGS

To describe the technical solutions of the embodiments of the present disclosure more clearly, the accompanying drawings required for describing the embodiments or the present disclosure will be briefly introduced below. Apparently, the accompanying drawings in the following description are merely some embodiments of the present disclosure. To those of ordinary skills in the art, other accompanying drawings may also be derived from these accompanying drawings without creative efforts.

DETAILED DESCRIPTION

To make the foregoing objectives, features, and advantages of the present disclosure more apparent and lucid, the present disclosure is further described in detail below with reference to the accompanying drawings and embodiments. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

A domain knowledge graph extracts entities and relationships between the entities from specific resources in a specific field to create a knowledge base. Knowledge systems contained in the knowledge base generally have a strong domain specificity and professionalism. The domain knowledge graph is created from top to bottom, mainly including schema design, entity recognition, relationship extraction, entity linking, knowledge fusion, and knowledge calculation, etc. The key is how to automatically extract information to obtain a candidate knowledge unit, techniques involved therein include entity extraction, relationship extraction and attribute extraction, which are collectively referred to as information extraction. The information extraction is also referred to as triple (S, P, O) extraction, where S and O represent a subject and an object of a sentence, and correspond to the entities or attribute values in the knowledge graph, and P represents a predicate, and corresponds to a relationship between the entities. It is found that in a great majority of the existing methods, the information extraction is divided into two steps, i.e., entity recognition, and extraction of the relationship between the entities. However, the existing methods are lower in efficiency, and errors of the entity recognition may be transferred to the relationship extraction, which causes lower accuracy of the final results.

Figure 1:
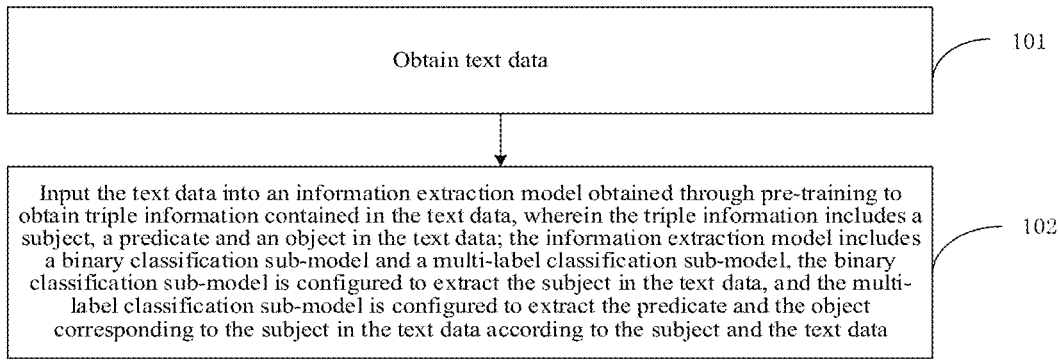
FIG. 1 illustrates a flowchart of steps of a method for information extraction according to an embodiment of the present disclosure.

To improve efficiency and accuracy of information extraction, an embodiment of the present disclosure provides a method for information extraction. Referring to FIG. 1, the method may include:

Step 101: obtaining text data.

In a specific implementation, an executive body may obtain data to be processed. The data to be processed may include, for example, data obtained instantly by the executive body (for example, a server) from a database, or data pre-stored in a memory cell of the executive body, or data imported from a third party, etc. The text data may include an unstructured text, etc. In some embodiments, the text data are the unstructured text.

In addition, the text data may also be derived from text information extracted from pictures or files in other formats. For example, the file that needs to be processed is a picture or a PDF file. In this step, the text data may be extracted from the picture or the PDF file by means of OCR recognition for processing.

Step 102: inputting the text data into an information extraction model obtained through pre-training to obtain triple information contained in the text data, wherein the triple information includes a subject, a predicate and an object in the text data. The information extraction model includes a binary classification sub-model and a multi-label classification sub-model. The binary classification sub-model is configured to extract the subject in the text data, and the multi-label classification sub-model is configured to extract the predicate and the object corresponding to the subject in the text data according to the subject and the text data.

In practical applications, domain knowledge graphs are generally constructed by means of a top-down approach. That is, the top-level design is first performed: determining types of entities, attributes, and relationships contained in the knowledge graphs. There is no fixed standard in the top-level design, and the top-level design generally is completed according to business needs. For example, in the field of art, it may be necessary to obtain entities such as paintings, painters, and art institutions. There exist many attribute values and relationships between these entities and entities. Paintings have attributes such as creation time and creation media, and creation relationships exist between the painters and the paintings. Based on this, information extraction schema may be constructed as below:

{'subject': painting, 'predicate': creation year, 'object': year, 'subject_type': art_work, 'object_type': time};

{'subject': painting, 'predicate': creation media, 'object': media, 'subject_type': art_work, 'object_type': media}; and {'subject': painting, 'predicate': collection place, 'object': art institution, 'subject_type': art_work, 'object_type': institution}; . . . .

wherein 'subject' represents the subject s in a triple, 'predicate' represents the predicate p (which is also referred to as a relationship) in the triple, 'object' represents the object o in the triple, 'subject_type' represents the entity type of the subject, and 'object_type' represents the entity type of the object. Each relationship determines a piece of schema information. After the subject, the predicate and the object are determined, the entities of the subject s and of the object o are also determined. Thus, the above schema may be simplified as: (painting, creation year, year), (painting, creation media, media), (painting, collection place, art institution), and so on.

When the text data are "Mona Lisa, an oil painting created by the Italian Renaissance painter Leonardo da Vinci, is collected in the Louvre Museum in France at present", there are a plurality of triples in the unstructured text: (Mona Lisa, created by Leonardo da Vinci), (Mona Lisa, collected in the Louvre Museum in France), (Leonardo da Vinci, nationality, Italy), and (Mona Lisa, creation category: oil painting). One subject may correspond to a plurality of different objects, and in this case, the plurality of triples in the sentence cannot be extracted simultaneously by means of the traditional pipeline extraction. In this embodiment, the idea of conditional probability may be adopted. First, the subject s is predicted, next, the subject s is inputted to predict the object o corresponding to the subject s, and next, both the subject s and object o are inputted to predict the relational predicate p. In practical applications, the prediction of the object o and the predicate p may be combined into one step. That is, the subject s is predicted first, and then the subject s is inputted to predict the object o and the predicate p corresponding to the subject s, as shown in the following formula:

$$P(s,p,o)=P(s)P(o|s)P(p|s,o)$$

The binary classification sub-model and the multi-label classification sub-model in the information extraction model may be obtained by jointly training the pre-trained language model and the neural network model by means of the unstructured text annotated with triple information. The training process of the information extraction model and the process of annotating the unstructured text will be described in detail in the subsequent embodiments.

In a specific implementation, the text data are first inputted into the binary classification sub-model, and all the subjects in the text data are extracted by the binary classification sub-model. Next, the subjects and the text data are sent in pairs to the multi-label classification sub-model, such that the multi-label classification sub-model extracts the predicates and the objects corresponding to the subjects in the text data. In this way, the triple information in the information text data may be outputted only by inputting the text data into the information extraction model and processing text data by means of the binary classification sub-model and the multi-label classification sub-model in the information extraction model. That is, the present disclosure adopts an end-to-end entity relationship joint extraction model in place of a traditional pipeline extraction method based on entity recognition and relationship extraction, which can improve efficiency and accuracy of information extraction.

Figure 2:
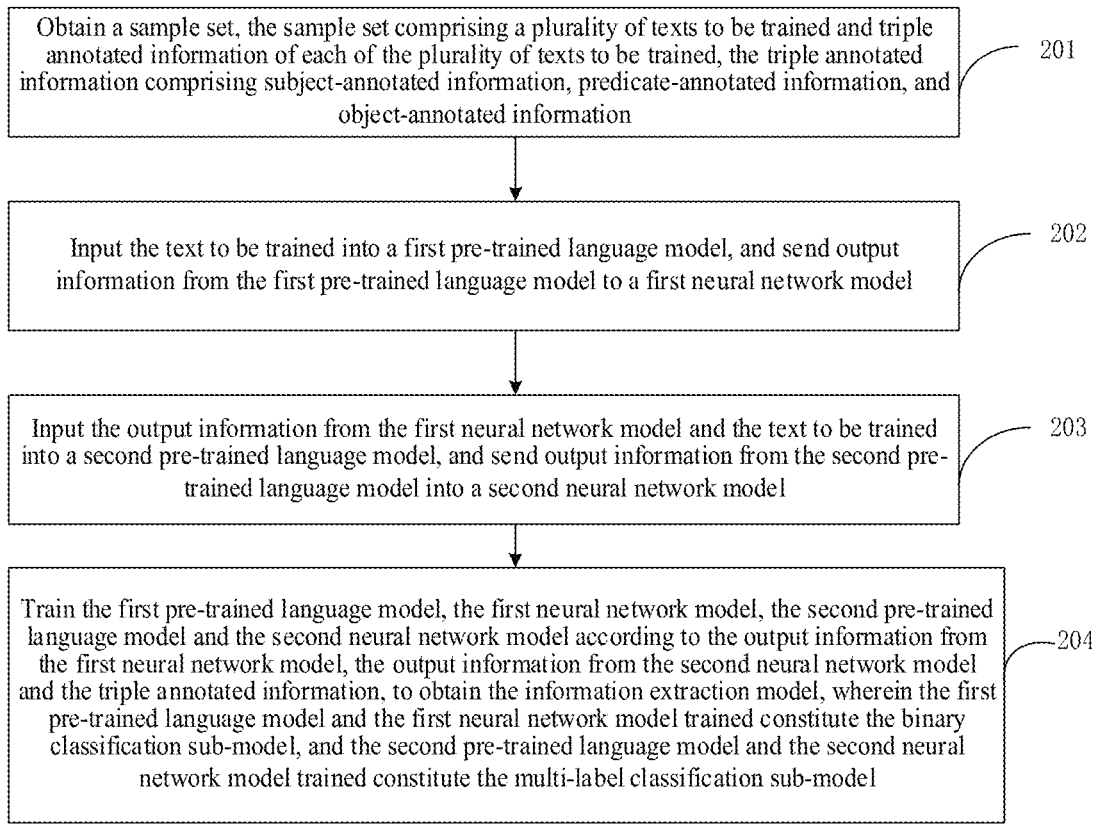
FIG. 2 illustrates a flowchart of steps for obtaining an information extraction model according to an embodiment of the present disclosure.

To obtain the information extraction model, in an alternative implementation, before Step 102, the method may further include a step of obtaining the information extraction model. Referring to FIG. 2, the step of obtaining the information extraction model may specifically include:

Step 201: obtaining a sample set, the sample set comprising a plurality of texts to be trained and triple annotated information of each of the plurality of texts to be trained, the triple annotated information comprising subject-annotated information, predicate-annotated information, and object-annotated information.

The text to be trained may be, for example, "Mona Lisa, an oil painting created by the Italian Renaissance painter Leonardo da Vinci, is collected in the Louvre Museum in France at present". The triple information in the text to be trained includes: (Mona Lisa, created by Leonardo da Vinci), (Mona Lisa, collected in the Louvre Museum in France), (Leonardo da Vinci, nationality, Italy), and (Mona Lisa, creation category: oil painting).

Figure 3:
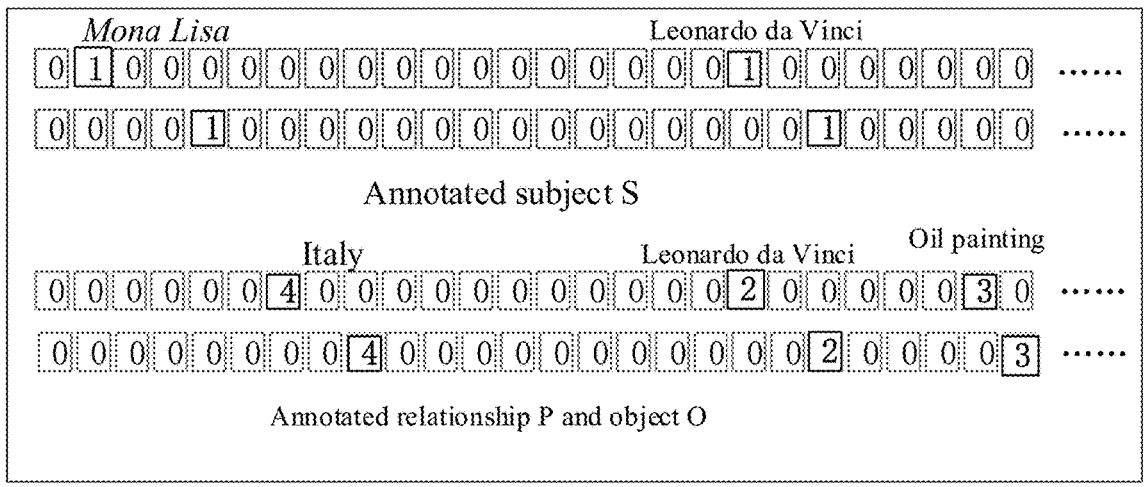
FIG. 3 illustrates a format of triple annotated information according to an embodiment of the present disclosure.

In a specific implementation, before the text to be trained and the triple information corresponding to the text to be trained are inputted into the model, the triple information may be annotated in a specific format. Specifically, when predicting the subject, starting and ending positions of the subject S in a sentence may be annotated. For example, when annotating (Mona Lisa, created by Leonardo da Vinci), (Mona Lisa, creation category: oil painting), and (Leonardo da Vinci, nationality, Italy), starting and ending positions of the subjects (Mona Lisa and Leonardo da Vinci) in the sentence may be annotated respectively by two sequences. That is, numerical value 1 is annotated in the corresponding starting and ending positions, and numerical value 0 is annotated in other positions. FIG. 3 illustrates subject-annotated information of the text to be trained. When in prediction, the starting and ending positions of the subject may be determined by means of binary classification (differentiating between 0 and 1). After the subject is obtained, the relationship (predicate) and the object may be predicted by means of the obtained subject. The method for annotating the object is similar to the method for annotating the subject, and the difference therebetween is that an index ID corresponding to the predicate may be annotated on the starting and ending positions of the object. One index may be established for each predicate in advance, for example, {1: collection location, 2: author, 3: creation category, 4: nationality, . . . }. FIG. 3 illustrates predicate-annotated information and object-annotated information of the text to be trained. When the predicate and the object are predicted, it is only required to make one multi-label classification.

Step 202: inputting the text to be trained into a first pre-trained language model, and sending output information from the first pre-trained language model to a first neural network model.

Step 203: inputting the output information from the first neural network model and the text to be trained into a second pre-trained language model, and sending output information from the second pre-trained language model into a second neural network model.

Step 204: training the first pre-trained language model, the first neural network model, the second pre-trained language model and the second neural network model according to the output information from the first neural network model, the output information from the second neural network model and the triple annotated information, to obtain the information extraction model. The first pre-trained language model and the first neural network model trained constitute the binary classification sub-model, and the second pre-trained language model and the second neural network model trained constitute the multi-label classification sub-model.

In concrete implementation, a first loss function may be determined according to the output information from the first neural network model and the subject-annotated information. A second loss function may be determined according to the output information from the second neural network model, the predicate-annotated information, and the object-annotated information. Parameters in the first pre-trained language model, the first neural network model, the second pre-trained language model and the second neural network model are optimized to obtain the information extraction model, such that sum of the first loss function and the second loss function is minimum.

The first pre-trained language model and the second pre-trained language model may be BERT models, ERNIE models, or Span BERT models, etc. In the following, reference is made by taking an example where the first pre-trained language model and the second pre-trained language model are both the BERT models. The first neural network model is Dense layer+sigmod, the second neural network model is Dense layer+softmax, and both the first loss function and the second loss function are cross-entropy loss functions. It should be noted that the minimum sum of the first loss function and the second loss function is not limited to a value, but numerical range.

Figure 4:
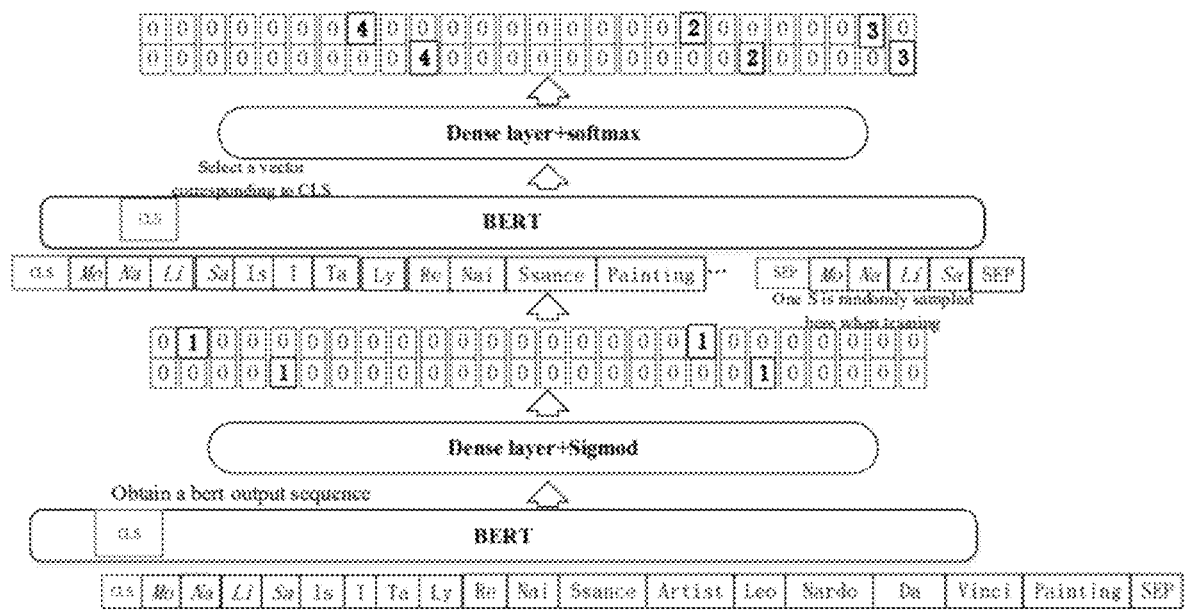
FIG. 4 illustrates a training framework of an information extraction model according to an embodiment of the present disclosure.

FIG. 4 illustrates a training framework of an information extraction model. Specific steps of model training are as follows. First, the text to be trained X, namely [CLS] Mona Lisa is an oil painting created by the Italian Renaissance painter Leonardo da Vinci . . . [SEP], is inputted into the BERT model by means of single input. Encoding of output information from the BERT model is sent to the Dense layer+sigmod. The first loss function loss_s (cross-entropy loss function) serves as a binary classification annotation model configured to train and predict the starting and ending positions of the subject. After the training, the first pre-trained language model (BERT) and the first neural network model (Dense layer+sigmod) constitute a binary classification sub-model subject_model. Next, one subject such as Mona Lisa is randomly selected, and the subject and the text to be trained are composed into a sentence pair Y The sentence pair Y is inputted into the BERT model in pairs by means of dual input. For example, [CLS] Mona Lisa is an oil painting [SEP] created by the Italian Renaissance painter Leonardo da Vinci, Mona Lisa[SEP], where [CLS] serves as a special mark bit for classification, and represents a vector representation of the text processed by the BERT model, and [SEP]represents a separator between sentences. The output information (i.e., a vector corresponding to [CLS]) from the BERT model is sent to the Dense layer+softmax, such that multi-classification training for predicting the predicate and the object is performed by means of the second loss function loss_o (cross-entropy loss function), and the second pre-trained language model (BERT) and the second neural network model (Dense layer+softmax) constitute the multi-label classification sub-model object_model. In practical applications, the binary classification sub-model subject_model and the multi-label classification sub-model object_model may be jointly trained. The objective of the joint training is to minimize the joint loss function loss=loss_s+loss_o. Parameters in the first pre-trained language model, the first neural network model, the second pre-trained language model and the second neural network model are iteratively optimized to obtain the information extraction model.

Specifically, on the task of subject extraction, the output information of an input sample X encoded by the BERT model may be expressed as:

$$h_0 = XW_t + W_p$$

$$h_l = \text{Transformer}(l-1) \quad l \in [1,L] \quad (1)$$

wherein $W_t$ represents a word embedding matrix, $h_i$ represents a hidden layer vector (i.e., output of an $i^{th}$ layer of Transformer network), and L represents number of layers of Transformer.

Here, starting and ending positions of the subject may be determined by deciding, by means of two binary classifications, probability indicating whether an input sequence is 0/1 at the current position. That is, one subject is determined based on a fact that each position in a subject starting position sequence $S_s$ and a subject ending positions sequence $S_e$ may likely be a degree of confidence of the starting and ending positions of the subject. For example, a probability distribution $p_i^{s-s}$ (degree of confidence) of the starting position of a certain subject that likely appears at each position in $S_s$ may be expressed as:

$$p_i^{s-s} = \sigma(S_s), S_s = W_{start} h_l^i + b_{start} \quad (2)$$

wherein $W_{start}$ represents a trainable weight vector, $b_{start}$ represents a bias term, $\sigma$ represents a sigmoid activation function, $h_l^i$ represents a coded representation of the $i^{th}$ input sequence processed by the BERT model, which is obtained from Equation (1). Similarly, the probability distribution $p_i^{s-e}$ of the ending position of this subject that likely appears at each position in $S_e$ may be expressed as:

$$p_i^{s-e} = \sigma(S_e), S_e = W_{end} h_l^i + b_{end} \quad (3)$$

Finally, two vectors $p_i^{s-s}$ and $p_i^{s-e}$ are obtained, and a trained objective function is:

$$\text{loss\_s} = -\sum_{i=1}^{n+2} p_i^{s-s} \log(p_i^{s-s}) - \sum_{j=1}^{n+2} p_j^{s-e} \log(p_j^{s-e}) \quad (4)$$

Similarly, when extracting the objects and the relationships (predicates), one subject may be randomly sampled from the subjects, the subject is combined with a sentence into a sentence-pair embedding mode, after being encode by the BERT model, the coded representation is obtained:

$$h_0 = YW_t + W_s + W_p$$

$$h_l = \text{Transformer}(h_{l-1}), l \in [1,L] \quad (5)$$

wherein $W_s$ represents a sentence embedding matrix.

Further, starting and ending positions of the object may be determined by means of two sequences in the same way. As shown in FIG. 3, different from the subject extraction, the starting and ending positions of the object and the relationship may be simultaneously determined by means of multi-label classification. That is, the probabilities $p_i^{o-r-s}$ and $p_i^{o-r-e}$ of a relationship label are determined respectively on the starting and ending positions of the object, $$p_i^{o-r-s} = \alpha(\tilde{S}_s), \tilde{S}_s = W_{start}^r h_l^i + b_{start}^r \quad (6)$$

$$p_i^{o-r-e} = \alpha(\tilde{S}_s), \tilde{S}_s = W_{end}^r h_l^i + b_{end}^r \quad (7)$$

wherein $W_{start}^r$ represents the trainable weight vector, $b_{start}^r$ represents the bias term, and $\alpha$ represents a softmax activation function. The trained objective function is:

$$\text{loss\_o} = -\sum_{i=1}^{n+2}\sum_r^R t_{r,i}^s \log(p_i^{o-r-s}) - \sum_{j=1}^{n+2}\sum_r^R t_{r,j}^e \log(p_i^{o-r-e})$$

wherein $t_{r,i}^s$, represents a real relationship label, and R represents number of relationship labels.

Parameters to be optimized in the model training process are the above-mentioned trainable weight vectors, and the parameters are iteratively updated and optimized, such that the loss function loss is minimized.

The current mainstream methods for relationship extraction include a supervised learning method, a semi-supervised learning method, and an unsupervised learning method. Compared with the semi-supervised learning method and the unsupervised learning method, the supervised learning method has higher accuracy and recall rates, and thus attracts more and more attention. The supervised learning method requires a lot of data annotations, and thus how to improve data annotation efficiency is also an urgent problem to be solved.

Figure 5:
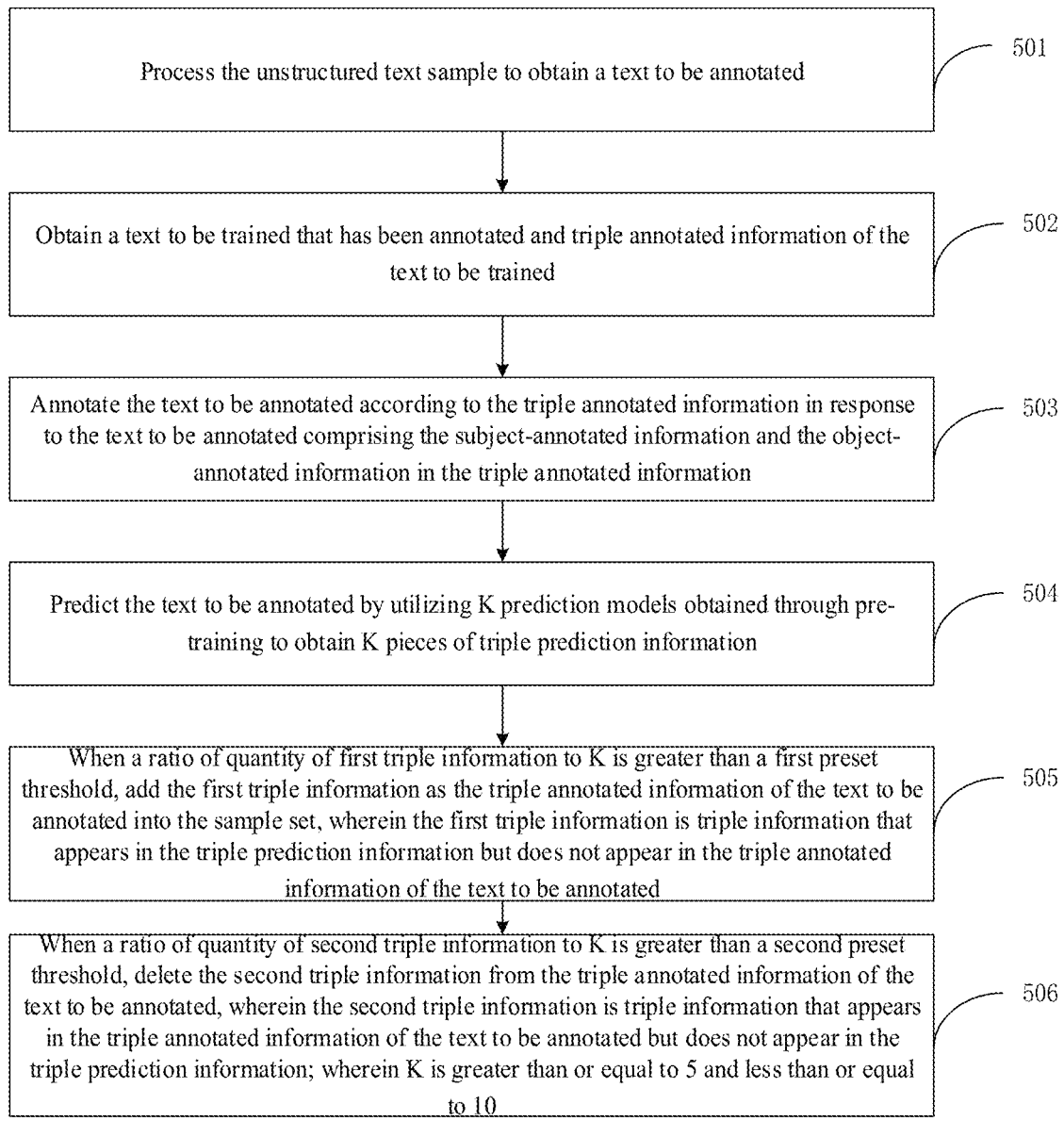
FIG. 5 illustrates a flowchart of steps of a method for automatic data annotation according to an embodiment of the present disclosure.

To improve the data annotation efficiency, in an alternative implementation, with reference to FIG. 5, Step 201 may include:

Step 501: processing the unstructured text sample to obtain a text to be annotated;

Step 502: obtaining a text to be trained that has been annotated and triple annotated information of the text to be trained; and Step 503: annotating the text to be annotated according to the triple annotated information in response to the text to be annotated comprising the subject-annotated information and the object-annotated information in the triple annotated information.

Figure 6:
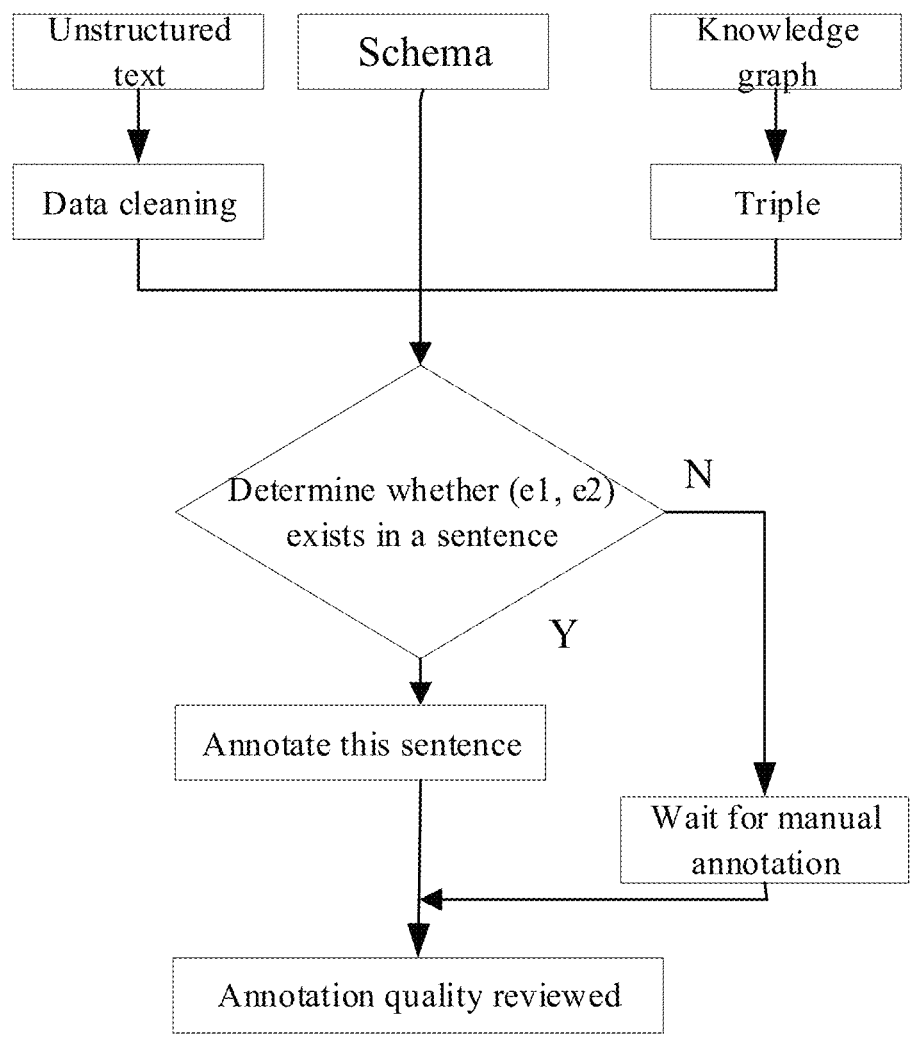
FIG. 6 illustrates a schematic flowchart of automatic annotation according to an embodiment of the present disclosure.

A lot of annotated data are required when the supervised method is employed for information extraction, which requires to consume a lot of manpower and financial resources to perform data annotation. When a knowledge base having a certain size is available, automatic corpus annotation may be carried out by means of a remote supervision method, and on this basis, manual review is carried out to deal with the problems of wrong annotation and missed annotation. With reference to FIG. 6, a flowchart of automatic annotation is illustrated, wherein unstructured data may be captured from art field websites by means of crawling, or may be obtained from unstructured information in the current knowledge graph. Of course, the unstructured data may also be directly obtained by searching from search engines such as Wikipedia, Google, and Baidu Baike based on entity words. In practical applications, processing such as data cleaning may be first performed on the unstructured data obtained from webpages by means of crawling, to remove useless punctuations and other useless information such as scripts, such that a text to be annotated Sentence is obtained. Next, the text to be annotated is annotated in a remote supervision mode by means of a predefined schema and the triple annotated information in the knowledge graph.

In specific implementation, it may be decided whether a subject e1 and an object e2 in the triple annotated information in the existing knowledge graph exist in the text to be annotated Sentence. If both the subject e1 and the object e2 exist, the text to be annotated is annotated according to the triple annotated information in the existing knowledge graph. In this way, costs of corpus annotation can be reduced by automatically annotating data by means of the existing knowledge base.

When the text to be annotated is "Mona Lisa, an oil painting created by the Italian Renaissance painter Leonardo da Vinci, is collected in the Louvre Museum in France at present", the text to be annotated has an annotation format as follows:

{'text': 'Mona Lisa, an oil painting created by the Italian Renaissance painter Leonardo da Vinci, is collected in the Louvre Museum in France at present', 'spo_list': [(Mona Lisa, created by Leonardo da Vinci), (Mona Lisa, collected in the Louvre Museum in France), (Leonardo da Vinci, nationality, Italy), and (Mona Lisa, creation category: oil painting)]}.

In addition, to reduce noise and annotation-missed data in the training data as much as possible, the automatically annotated data may be denoised by means of knowledge distillation. The foregoing implementation manner may also include:

Step 504: predicting the text to be annotated by utilizing K prediction models obtained through pre-training to obtain K pieces of triple prediction information.

The K prediction models are obtained by means of K-fold cross validation according to the text to be trained that has been annotated and the triple annotated information of the text to be trained.

Specifically, the training samples are equally divided into K shares, (K−1) shares of the training samples are selected as trained models, and the other one share is selected as a sample to be predicted. For example, the training samples may be divided into [D1, D2, D3, . . . , DK], and [D1, D2, . . . , Dk−1, Dk+1, . . . , DK] are sequentially selected as training samples, and Dk is selected as the sample to be predicted, k∈[1, K].

Step 505: when a ratio of quantity of first triple information to K is greater than a first preset threshold, adding the first triple information as the triple annotated information of the text to be annotated into the sample set, wherein the first triple information is triple information that appears in the triple prediction information but does not appear in the triple annotated information of the text to be annotated.

Step 506: when a ratio of quantity of second triple information to K is greater than a second preset threshold, deleting the second triple information from the triple annotated information of the text to be annotated, wherein the second triple information is triple information that appears in the triple annotated information of the text to be annotated but does not appear in the triple prediction information.

K is greater than or equal to 5 and less than or equal to 10, or may be self-defined according to data size. The first preset threshold may be equal or not equal to the second preset threshold, and a specific value may be determined according to actual needs.

In specific implementation, K models may be trained with annotated data by means of K-fold cross validation, and then the text to be annotated is predicted by means of the K models trained. Results predicted by the model may deviate from original annotation results. For example, in a certain text to be annotated S, K ({T1, T2, T3, . . . Tk}) pieces of triple annotated information are annotated, annotated as R_s={T1, T2, T3, . . . Tk}. Next, K pieces of triple prediction information may be obtained by predicting the text to be annotated S by means of the K models. In the K pieces of triple prediction information, there probably exists a certain piece of first triple information Ti not in R_s, the first triple information Ti appears M times in the K pieces of triple prediction information. Furthermore, in the K pieces of triple prediction information, there probably exists N results not containing the second triple information Tj, and the second triple information Tj exists in R_s. In this case, the first preset threshold and the second preset threshold may be set as Score. When M/K>Score, the first triple information Ti is considered to be annotation-missed data of the text to be annotated, and thus the first triple information Ti may be added into the triple annotated information. When N/K>Score, the second triple information Tj is considered to be wrongly-annotated data, and thus the second triple information Tj needs to be deleted from the triple annotated information R_s. In this way, the samples are trained and predicted repeatedly, such that the training sample set can be continuously amended.

In this implementation, data are automatically annotated by means of the existing knowledge base, which can reduce costs of expected annotation. On this basis, manual review is performed, and the annotated data may be denoised by means of knowledge distillation subsequently.

Figure 7:
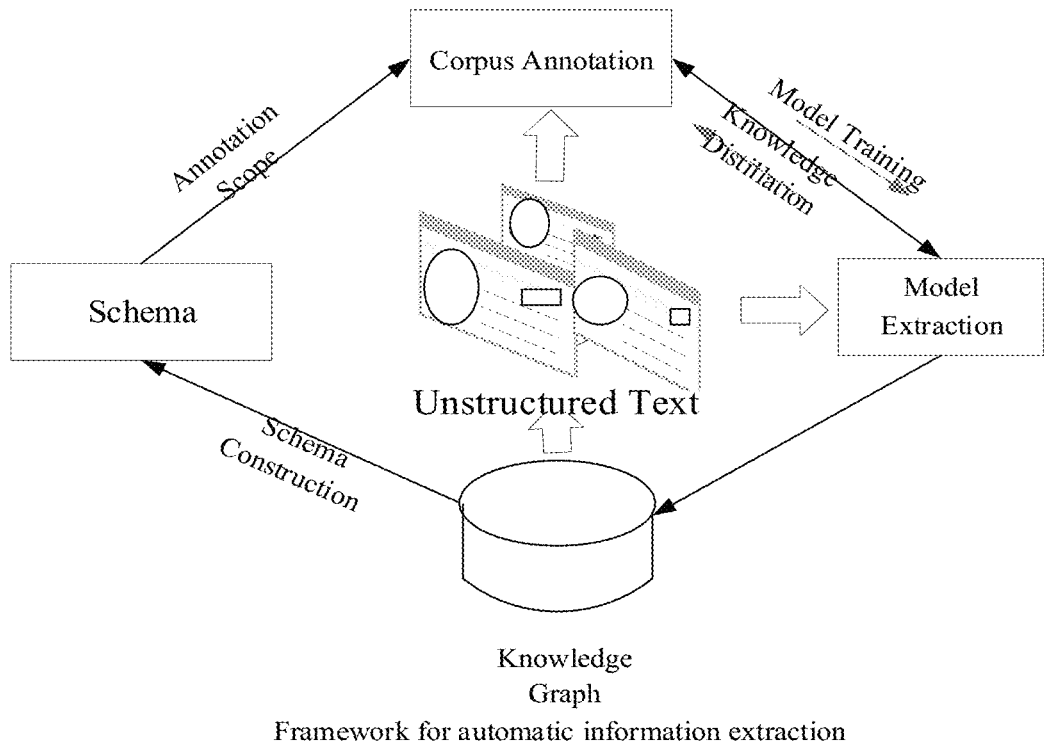
FIG. 7 illustrates a schematic flowchart of a method for information extraction according to an embodiment of the present disclosure.

With reference to FIG. 7, the method for information extraction provided in this embodiment mainly involves a plurality of main parts such as data annotation method, schema construction, information extraction algorithm model, and noise reduction of data. In this solution, knowledge is extracted from an unstructured text by means of an end-to-end entity relationship joint extraction method. While the accuracy of information extraction is ensured, costs of constructing a knowledge graph can be reduced, the efficiency of information extraction can be improved, and labor costs can be saved.

Figure 8:
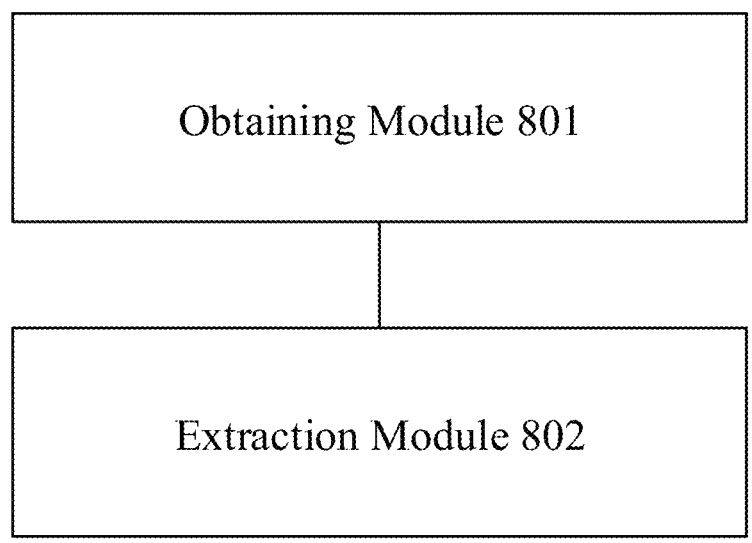
FIG. 8 illustrates a structural block diagram of an apparatus for information extraction according to an embodiment of the present disclosure.

Another embodiment of the present disclosure also provides an apparatus for information extraction. With reference to FIG. 8, the apparatus may include:

an obtaining module 801, configured to obtain text data; and an extraction module 802, configured to input the text data into an information extraction model obtained through pre-training to obtain triple information contained in the text data, wherein the triple information includes a subject, a predicate and an object in the text data. The information extraction model includes a binary classification sub-model and a multi-label classification sub-model. The binary classification sub-model is configured to extract the subject in the text data, and the multi-label classification sub-model is configured to extract the predicate and the object corresponding to the subject in the text data according to the subject and the text data.

Figure 9:
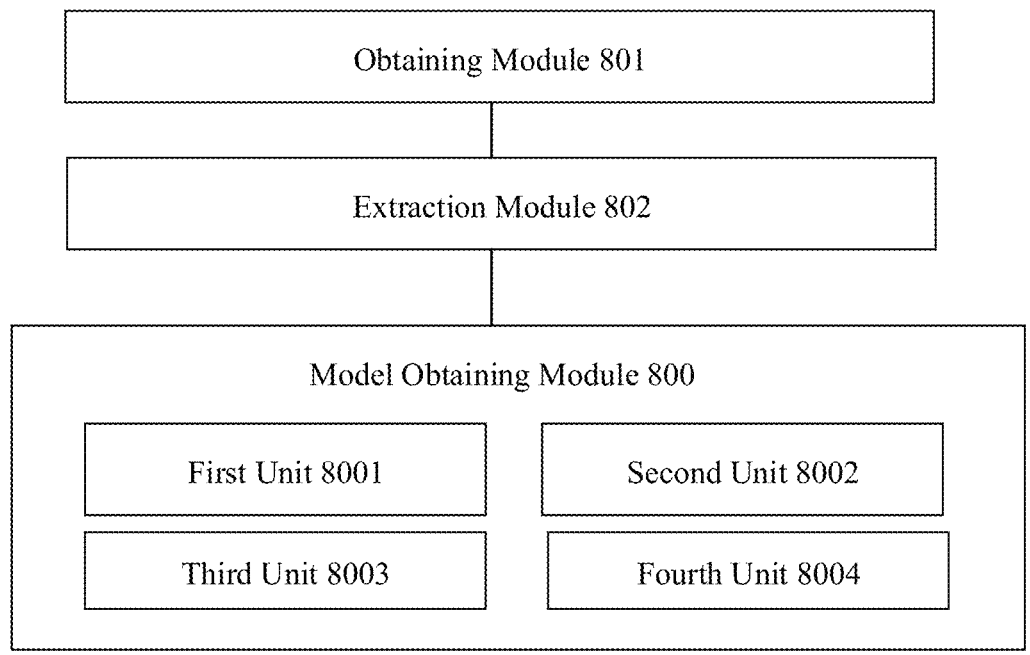
FIG. 9 illustrates a structural block diagram of a model obtaining module and units of the apparatus for information extraction according to an embodiment of the present disclosure.

In an alternative implementation, as shown in FIG. 9, the apparatus may further include a model obtaining module 800 configured to obtain the information extraction model. The model obtaining module includes:

a first unit 8001, configured to obtain a sample set, the sample set comprising a plurality of texts to be trained and triple annotated information of each of the plurality of texts to be trained, the triple annotated information comprising subject-annotated information, predicate-annotated information, and object-annotated information;

a second unit 8002, configured to input the text to be trained into a first pre-trained language model, and send output information from the first pre-trained language model to a first neural network model;

a third unit 8003, configured to input the output information from the first neural network model and the text to be trained into a second pre-trained language model, and send output information from the second pre-trained language model into a second neural network model;

a fourth unit 8004, configured to train the first pre-trained language model, the first neural network model, the second pre-trained language model and the second neural network model according to the output information from the first neural network model, the output information from the second neural network model and the triple annotated information, to obtain the information extraction model, wherein the first pre-trained language model and the first neural network model trained constitute the binary classification sub-model, and the second pre-trained language model and the second neural network model trained constitute the multi-label classification sub-model.

In an alternative implementation, the fourth unit is specifically configured to:

determine a first loss function according to the output information from the first neural network model and the subject-annotated information;

determine a second loss function according to the output information from the second neural network model, the predicate-annotated information, and the object-annotated information; and optimize parameters in the first pre-trained language model, the first neural network model, the second pre-trained language model and the second neural network model to obtain the information extraction model, such that sum of the first loss function and the second loss function is minimum.

In an alternative implementation, the first loss function and the second loss function both are cross-entropy loss functions.

In an alternative implementation, the first unit is specifically configured to:

obtain an unstructured text sample;

process the unstructured text sample to obtain a text to be annotated;

obtain a text to be trained that has been annotated and triple annotated information of the text to be trained; and annotate the text to be annotated according to the triple annotated information in response to the text to be annotated comprising the subject-annotated information and the object-annotated information in the triple annotated information.

In an alternative implementation, the first unit is also configured to:

predict the text to be annotated by utilizing K prediction models obtained through pre-training to obtain K pieces of triple prediction information;

when a ratio of quantity of first triple information to K is greater than a first preset threshold, add the first triple information as the triple annotated information of the text to be annotated into the sample set, wherein the first triple information is triple information that appears in the triple prediction information but does not appear in the triple annotated information of the text to be annotated; and when a ratio of quantity of second triple information to K is greater than a second preset threshold, delete the second triple information from the triple annotated information of the text to be annotated, wherein the second triple information is triple information that appears in the triple annotated information of the text to be annotated but does not appear in the triple prediction information.

K is greater than or equal to 5 and less than or equal to 10, or may be self-defined according to data size.

In an alternative implementation, the first unit is also configured to:

obtain the K prediction models by means of K-fold cross validation according to the text to be trained that has been annotated and the triple annotated information of the text to be trained.

With regard to the apparatus in the above embodiments, specific implementations for executing operations by modules thereof have been described in detail in the embodiments related to the method for information extraction applied to a server, and thus are not elaborated herein.

Still another embodiment of the present disclosure also provides an electronic device, comprising:

a processor, and a memory configured to store instructions executable by the processor.

The processor is configured to execute the instructions to implement the method for information extraction according to any one of the above embodiments.

Still another embodiment of the present disclosure also provides a storage medium. Instructions in the storage medium are executable by a processor of an electronic device, whereby the electronic device is caused to perform the method for information extraction according to any one of the above embodiments.

Apparatus embodiments set forth above are merely exemplary, wherein units described as detached parts may be or not be detachable physically; parts displayed as units may be or not be physical units, i.e., either located at the same place, or distributed on a plurality of network units. Modules may be selected in part or in whole according to actual needs to achieve objectives of the solution of this embodiment. Those of ordinary skill in the art may comprehend and implement the embodiment without contributing creative effort.

Each of devices according to the embodiments of the present disclosure can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the parts in the electronic device according to the embodiments of the present disclosure. The present disclosure may further be implemented as equipment or device program (for example, computer program and computer program product) for executing some or all of the methods as described herein. Such program for implementing the present disclosure may be stored in the computer readable medium, or have a form of one or more signals. Such a signal may be downloaded from the Internet websites, or be provided on a carrier signal, or provided in any other form.

Figure 10:
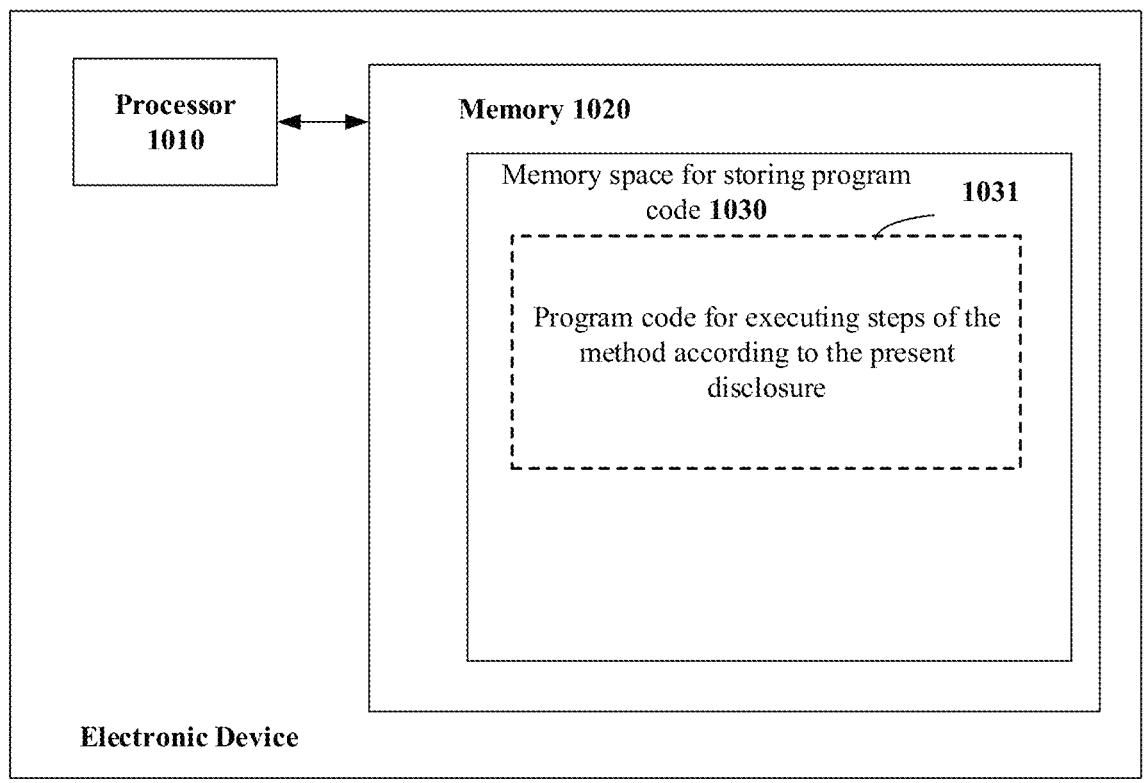
FIG. 10 schematically illustrates a block diagram of an electronic device for performing the method according to the present disclosure.
Figure 11:
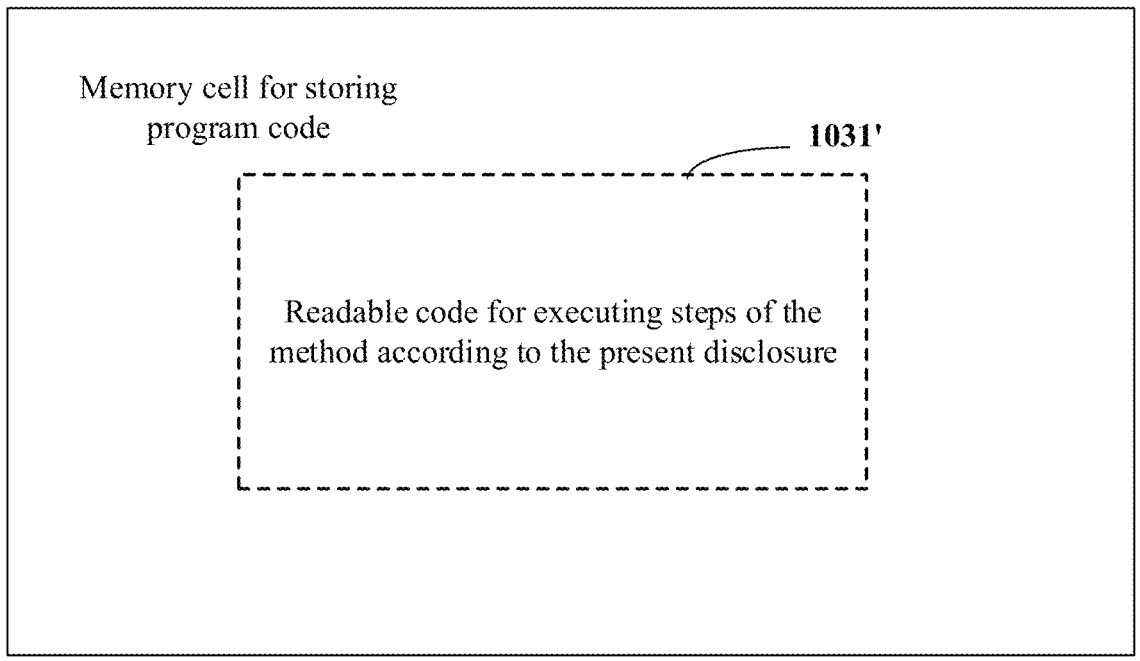
FIG. 11 schematically illustrates a memory cell for maintaining or carrying a program code for implementing the method according to the present disclosure.

For example, FIG. 10 illustrates an electronic device that may implement the method according to the present disclosure. Traditionally, the electronic device comprises a processor 1010 and a computer program product or a computer readable medium in form of a memory 1020. The memory 1020 may be electronic memories such as flash memory, EEPROM (Electrically Erasable Programmable Read-Only Memory), EPROM, hard disk or ROM. The memory 1020 has a memory space 1030 for executing program codes 1031 of any steps in the above methods. For example, the memory space 1030 for program codes may comprise respective program codes 1031 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 11. The memory cells may be provided with memory sections, memory spaces, etc., similar to the memory 1020 of the electronic device as shown in FIG. 10. The program codes may be compressed for example in an appropriate form. Usually, the memory cell includes computer readable codes 1031' which can be read for example by processors 1010. When these codes are operated on the electronic device, the electronic device may be caused to execute respective steps in the method as described above.

Compared with the existing technologies, the method and apparatus for information extraction, the electronic device and the storage medium provided by the embodiments of the present disclosure at least include following advantages.

The technical solutions of the present disclosure provide a method and an apparatus for information extraction, an electronic device, and a storage medium. The method for information extraction includes: first obtaining source data, and then inputting the source data into an information extraction model obtained through pre-training to obtain triple information contained in the source data, wherein the triple information includes a subject, a predicate and an object in the source data. The information extraction model includes a binary classification sub-model and a multi-label classification sub-model, wherein the binary classification sub-model is configured to extract the subject in the source data, and the multi-label classification sub-model is configured to extract the predicate and the object corresponding to the subject in the source data according to the subject and the source data. The technical solutions of the present disclosure adopt an end-to-end information extraction model to jointly extract the triple information in the source data in place of a traditional pipeline extraction method based on entity recognition and relationship extraction, and can improve efficiency and accuracy of information extraction.

The embodiments in the specification of the present disclosure are described in a progressive manner. Each embodiment is focused on difference from other embodiments. And cross reference is available for identical or similar parts among different embodiments.

Finally it should be explained that a relational term (such as a first or a second . . . ) is merely intended to separate one entity or operation from another entity or operation instead of requiring or hinting any practical relation or sequence exists among these entities or operations. Furthermore, terms such as "comprise", "include" or other variants thereof are intended to cover a non-exclusive "comprise" so that a process, a method, a merchandise or a device comprising a series of elements not only includes these elements, but also includes other elements not listed explicitly, or also includes inherent elements of the process, the method, the merchandise or the device. In the case of no more restrictions, elements restricted by a sentence "include a . . . " do not exclude the fact that additional identical elements may exist in a process, a method, a merchandise or a device of these elements.

The method and apparatus for information extraction, the electronic device and the storage medium provided by the present disclosure are introduced in detail hereinabove. Elaboration of principles and implementations of the present disclosure is made by using specific examples herein, and description of the foregoing embodiments is merely intended to assist in understanding the method of the present disclosure and a core concept thereof. Also, those of ordinary skill in the art may change, in according with the core concept of the present disclosure, concrete implementations and scope of application. In conclusion, contents of the specification shall not be interpreted as limiting the present disclosure.

The invention claimed is:

1. A method for information extraction, comprising:
   obtaining text data; and
   inputting the text data into an information extraction model obtained through pre-training to obtain triple information contained in the text data, the triple information comprising a subject, a predicate and an object in the text data;
   wherein the information extraction model comprises a binary classification sub-model and a multi-label classification sub-model, the binary classification sub-model is configured to extract the subject in the text data, and the multi-label classification sub-model is configured to extract the predicate and the object corresponding to the subject in the text data according to the subject and the text data;
   wherein before the step of inputting the text data into the information extraction model obtained through pre-training to obtain triple information contained in the text data, the method for information extraction further comprises obtaining the information extraction model; and
   wherein the step of obtaining the information extraction model comprises:
   obtaining a sample set, the sample set comprising a plurality of texts to be trained and triple annotated information of each of the plurality of texts to be trained, the triple annotated information comprising subject-annotated information, predicate-annotated information, and object-annotated information;
   inputting the text to be trained into a first pre-trained language model, and sending output information from the first pre-trained language model to a first neural network model;
   inputting the output information from the first neural network model and the text to be trained into a second pre-trained language model, and sending output information from the second pre-trained language model into a second neural network model; and
   training the first pre-trained language model, the first neural network model, the second pre-trained language model and the second neural network model according to the output information from the first neural network model, the output information from the second neural network model and the triple annotated information, to obtain the information extraction model, wherein the first pre-trained language model and the first neural network model trained constitute the binary classification sub-model, and the second pre-trained language model and the second neural network model trained constitute the multi-label classification sub-model.

2. The method for information extraction according to claim 1, wherein the step of training the first pre-trained language model, the first neural network model, the second pre-trained language model and the second neural network model according to the output information from the first neural network model, the output information from the second neural network model and the triple annotated information, to obtain the information extraction model comprises:
  determining a first loss function according to the output information from the first neural network model and the subject-annotated information;
  determining a second loss function according to the output information from the second neural network model, the predicate-annotated information, and the object-annotated information; and
  optimizing parameters in the first pre-trained language model, the first neural network model, the second pre-trained language model and the second neural network model to obtain the information extraction model, such that sum of the first loss function and the second loss function is minimum.

3. The method for information extraction according to claim 2, wherein the first loss function and the second loss function both are cross-entropy loss functions.

4. The method for information extraction according to claim 1, wherein the step of obtaining the sample set comprises:
  obtaining an unstructured text sample;
  processing the unstructured text sample to obtain a text to be annotated;
  obtaining a text to be trained that has been annotated and triple annotated information of the text to be trained; and
  annotating the text to be annotated according to the triple annotated information in response to the text to be annotated comprising the subject-annotated information and the object-annotated information in the triple annotated information.

5. The method for information extraction according to claim 4, wherein the step of obtaining the sample set further comprises:
  predicting the text to be annotated by utilizing K prediction models obtained through pre-training to obtain K pieces of triple prediction information;
  when a ratio of quantity of first triple information to K is greater than a first preset threshold, adding the first triple information as the triple annotated information of the text to be annotated into the sample set, wherein the first triple information is triple information that appears in the triple prediction information but does not appear in the triple annotated information of the text to be annotated; and
  when a ratio of quantity of second triple information to K is greater than a second preset threshold, deleting the second triple information from the triple annotated information of the text to be annotated, wherein the second triple information is triple information that appears in the triple annotated information of the text to be annotated but does not appear in the triple prediction information.

6. The method for information extraction according to claim 5, wherein K is greater than or equal to 5 and less than or equal to 10.

7. The method for information extraction according to claim 5, wherein before the step of predicting the text to be annotated by utilizing K prediction models obtained through pre-training to obtain K pieces of triple prediction information, the method for information extraction comprises:
  obtaining the K prediction models by means of K-fold cross validation according to the text to be trained that has been annotated and the triple annotated information of the text to be trained.

8. A non-transitory computer-readable storage medium, wherein a computer program code in the storage medium is executable by a processor of an electronic device, whereby the electronic device is configured to perform the method for information extraction according to claim 1.

9. A non-transitory computer program product, comprising a computer program code, wherein the computer program code is executable by a processor of an electronic device, whereby the electronic device is configured to perform the method for information extraction according to claim 1.

10. An electronic device, comprising:
  a processor, and
  a memory, configured to store instructions executable by the processor;
  wherein the processor is configured to execute the instructions to perform following operation for information extraction, comprising:
  obtaining text data; and
  inputting the text data into an information extraction model obtained through pre-training to obtain triple information contained in the text data, the triple information comprising a subject, a predicate and an object in the text data;
  wherein the information extraction model comprises a binary classification sub-model and a multi-label classification sub-model, the binary classification sub-model is configured to extract the subject in the text data, and the multi-label classification sub-model is configured to extract the predicate and the object corresponding to the subject in the text data according to the subject and the text data;
  wherein before the operation of inputting the text data into the information extraction model obtained through pre-training to obtain triple information contained in the text data, the operation for information extraction further comprises obtaining the information extraction model; and
  wherein the operation of obtaining the information extraction model comprises:
  obtaining a sample set, the sample set comprising a plurality of texts to be trained and triple annotated information of each of the plurality of texts to be trained, the triple annotated information comprising subject-annotated information, predicate-annotated information, and object-annotated information;
  inputting the text to be trained into a first pre-trained language model, and sending output information from the first pre-trained language model to a first neural network model;
  inputting the output information from the first neural network model and the text to be trained into a second pre-trained language model, and sending output information from the second pre-trained language model into a second neural network model; and
  training the first pre-trained language model, the first neural network model, the second pre-trained language model and the second neural network model according to the output information from the first neural network model, the output information from the second neural network model and the triple annotated information, to obtain the information extraction model, wherein the first pre-trained language model and the first neural network model trained constitute the binary classification sub-model, and the second pre-trained language model and the second neural network model trained constitute the multi-label classification sub-model.

11. The electronic device according to claim 10, wherein the operation of training the first pre-trained language model, the first neural network model, the second pre-trained language model and the second neural network model according to the output information from the first neural network model, the output information from the second neural network model and the triple annotated information, to obtain the information extraction model comprises:
  determining a first loss function according to the output information from the first neural network model and the subject-annotated information;
  determining a second loss function according to the output information from the second neural network model, the predicate-annotated information, and the object-annotated information; and
  optimizing parameters in the first pre-trained language model, the first neural network model, the second pre-trained language model and the second neural network model to obtain the information extraction model, such that sum of the first loss function and the second loss function is minimum.

12. The electronic device according to claim 11, wherein the first loss function and the second loss function both are cross-entropy loss functions.

13. The electronic device according to claim 10, wherein the operation of obtaining the sample set comprises:
  obtaining an unstructured text sample;
  processing the unstructured text sample to obtain a text to be annotated;
  obtaining a text to be trained that has been annotated and triple annotated information of the text to be trained; and
  annotating the text to be annotated according to the triple annotated information in response to the text to be annotated comprising the subject-annotated information and the object-annotated information in the triple annotated information.

14. The electronic device according to claim 13, wherein the operation of obtaining the sample set further comprises:
  predicting the text to be annotated by utilizing K prediction models obtained through pre-training to obtain K pieces of triple prediction information;
  when a ratio of quantity of first triple information to K is greater than a first preset threshold, adding the first triple information as the triple annotated information of the text to be annotated into the sample set, wherein the first triple information is triple information that appears in the triple prediction information but does not appear in the triple annotated information of the text to be annotated; and
  when a ratio of quantity of second triple information to K is greater than a second preset threshold, deleting the second triple information from the triple annotated information of the text to be annotated, wherein the second triple information is triple information that appears in the triple annotated information of the text to be annotated but does not appear in the triple prediction information.

15. The electronic device according to claim 14, wherein K is greater than or equal to 5 and less than or equal to 10.

16. The electronic device according to claim 14, wherein before the operation of predicting the text to be annotated by utilizing K prediction models obtained through pre-training to obtain K pieces of triple prediction information, the operation for information extraction comprises:
  obtaining the K prediction models by means of K-fold cross validation according to the text to be trained that has been annotated and the triple annotated information of the text to be trained.

* * * * *